[19] Benayad-Cherif et al.

[11] Patent Number: 4,815,840
[45] Date of Patent: Mar. 28, 1989

[54] POSITION LOCATING SYSTEM FOR A VEHICLE

[76] Inventors: Faycal E. K. Benayad-Cherif, 66 Highland Ave., #4, Somerville, Mass. 02143; James F. Maddox, 55 Hillside Ave., Arlington, Mass. 02174; Robert W. George, II, 2 Karen Rd., Windham, N.H. 03087

[21] Appl. No.: 864,031
[22] Filed: May 16, 1986
[51] Int. Cl.⁴ .......................... G01C 3/00; B60T 7/16; B25J 5/00
[52] U.S. Cl. ....................................... 356/1; 356/152; 180/168; 250/215; 364/443; 901/1
[58] Field of Search ............... 180/167, 168; 250/215; 356/1, 4, 152, 141; 364/443; 901/1

[56] References Cited

U.S. PATENT DOCUMENTS

| 4,081,669 | 3/1978 | Klingman, III | 356/152 X |
| 4,119,900 | 10/1978 | Kremnitz | 318/587 |
| 4,218,616 | 8/1980 | Loomer | 356/152 X |
| 4,264,161 | 4/1981 | Hosoe et al. | 354/442 X |
| 4,274,503 | 6/1981 | Mackintosh | 180/23 |
| 4,328,545 | 5/1982 | Halsall et al. | 356/152 X |
| 4,441,810 | 4/1984 | Momose et al. | 356/1 |
| 4,445,029 | 4/1984 | Nagaoka et al. | 356/1 X |
| 4,463,821 | 8/1984 | Falamak | 180/168 |
| 4,500,970 | 2/1985 | Daemmer | 364/513 |
| 4,573,548 | 3/1986 | Holland | 180/211 |
| 4,630,208 | 12/1986 | Pechon | 364/443 |
| 4,638,445 | 1/1987 | Mattaboni | 364/513 |
| 4,658,385 | 4/1987 | Tsuji | 367/105 |

FOREIGN PATENT DOCUMENTS 6063698 4/1985 Japan.

OTHER PUBLICATIONS

"Towards Autonomous Vehicles," 1984 Annual Research Report, Robotics Institute, Carnegie-Mellon University, pp. 33-49, 1985.
Kujiwara, T., "Development of a Mobile Robot for Security Guard," pp. 271-278 (date unknown).

Primary Examiner—Stephen C. Buczinski
Assistant Examiner—Linda J. Wallace
Attorney, Agent, or Firm—Joseph S. Iandiorio; Douglas E. Denninger; Brian M. Dingman

[57] ABSTRACT

A position locating system for a vehicle such as a mobile robot which includes a multisector sensor for sensing the coded signal emitted by a beacon. There are means responsive to the sensor for generating a code data signal representative of the coded signal and means responsive to the sensor sectors for generating an angle data signal representative of the angle from sensor to the beacon and at least one of the azimuthal and altitude dimensions.

16 Claims, 12 Drawing Sheets

FIG. 12

POSITION LOCATING SYSTEM FOR A VEHICLE

FIELD OF INVENTION

This invention relates to a position locating system for a vehicle or mobile robot, and more particularly to such a system which determines the angles from the vehicle to a remote beacon.

CROSS-REFERENCES

The following applications, filed concurrently herewith, are incorporated herein by reference:

| Inventors | Title | Serial No. |
|---|---|---|
| Maddox et al. | Intrusion Detection System | 864,032 |
| Muller et al. | Ultrasonic Ranging System | 864,002, now U.S. Pat. No. 4,701,893 |
| Pavlak et al. | Power-Up Sequencing Apparatus | 864,590, now U.S. Pat. No. 4,736,116 |
| Maddox et al. | Beacon Proximity Detection System for Vehicle | 864,292, now U.S. Pat. No. 4,710,020 |
| Kadonoff et al. | Orientation Adjustment System and Robot Using Same | 864,450 |
| Kadonoff et al. | Obstacle Avoidance System | 864,585, now U.S. Pat. No. 4,751,658 |
| Kadonoff et al. | Beacon Navigation System Method for Guiding a Vehicle | 864,442 |
| George II et al. | Recharge Docking System for Mobile Robot | 864,028 |

BACKGROUND OF INVENTION

Mobile robots are being used more and more to perform tedious and dangerous tasks and to provide security. A serious problem is presented by autonomous mobile robots which patrol a secured space in some pattern or randomly. To keep from becoming lost, stymied and ineffective the robot must know where it is. In the past, robots have been made to home in on a signal to return to base. But this does not help determine position; it only vectors home the robot. If a fire or intrusion occurred the robot might detect it but would be unable to relay its location. Most robots cannot safely travel more than a few feet from the homing signal. Closer control can be achieved by connecting the robot by cable directly to a central computer. But the disadvantages of trailing a cable about make this approach unappealing. Typically the locator signals are infrared and suffer from high background noise due to ambient light such as daylight, incandescent and fluorescent. Because of this some systems are required to be operated in the dark or very low light conditions.

SUMMARY OF INVENTION

It is therefore an object of this invention to provide an improved position locating system for a vehicle such as a mobile robot.

It is a further object of this invention to provide such an improved locating system which defines the location of the vehicle with respect to a specific one of a known number of beacons.

It is a further object of this invention to provide such an improved locating system which is able to operate in ambient light conditions.

It is a further object of this invention to provide such an improved locating system which has increased sensitivity and can operate for greater distances from a beacon.

The invention results from the realization that a truly effective position locating system for a vehicle such as a mobile robot may be achieved by using a number of remote, uniquely identifiable beacons to provide a signal whose altitude and azimuthal angle relative to the robot can be readily ascertained and used to calculate location of the robot by direction and/or distance between the beacon and the robot.

This invention also features a position locating system for a vehicle such as a mobile robot. A multisector sensor is carried by the vehicle or robot for sensing the coded signal emitted by a beacon. There are means responsive to the sensor for generating a code data signal representative of the coded signal and means responsive to the sensor sectors for generating an angle data signal representative of the angle from the sensor to the beacon in at least one of the azimuthal and altitude dimensions.

In a preferred embodiment there are a plurality of remote beacons each beacon producing a coded signal which uniquely identifies that beacon. The angle may be the altitude angle, and there are means responsive to the altitude angle for calculating the distance from the sensor to the beacon, or the angle may be the azimuthal angle and there may be means responsive to the azimuthal angle for calculating the direction from the beacon to the sensor.

Each said beacon may be self-contained and independent of the other beacons. The coded signal may be an optical signal such as an infrared signal. The means for generating the coded data signal may include summing means for combining the outputs of one or more of the sectors of the multisector sensor. The sensor may be a lateral effect photodiode and the infrared signal provided to it from the beacon may be in the range of 904 nanometers. The means for generating may include a differentiator circuit for detecting signal transitions. The means for generating may still further include pulse generating means responsive to the differentiator circuit for reconstructing the coded signal from the code data signal. The means for generating an angle data signal may include means for filtering out ambient light and means for converting the output from each sector of the sensor from an analog to a digital signal. The coded signal may be a modulated optical signal such as a modulated infrared signal.

DISCLOSURE OF PREFERRED EMBODIMENT

Other objects, features and advantages will occur from the following description of a preferred embodiment and the accompanying drawings, in which.

Figure 1:
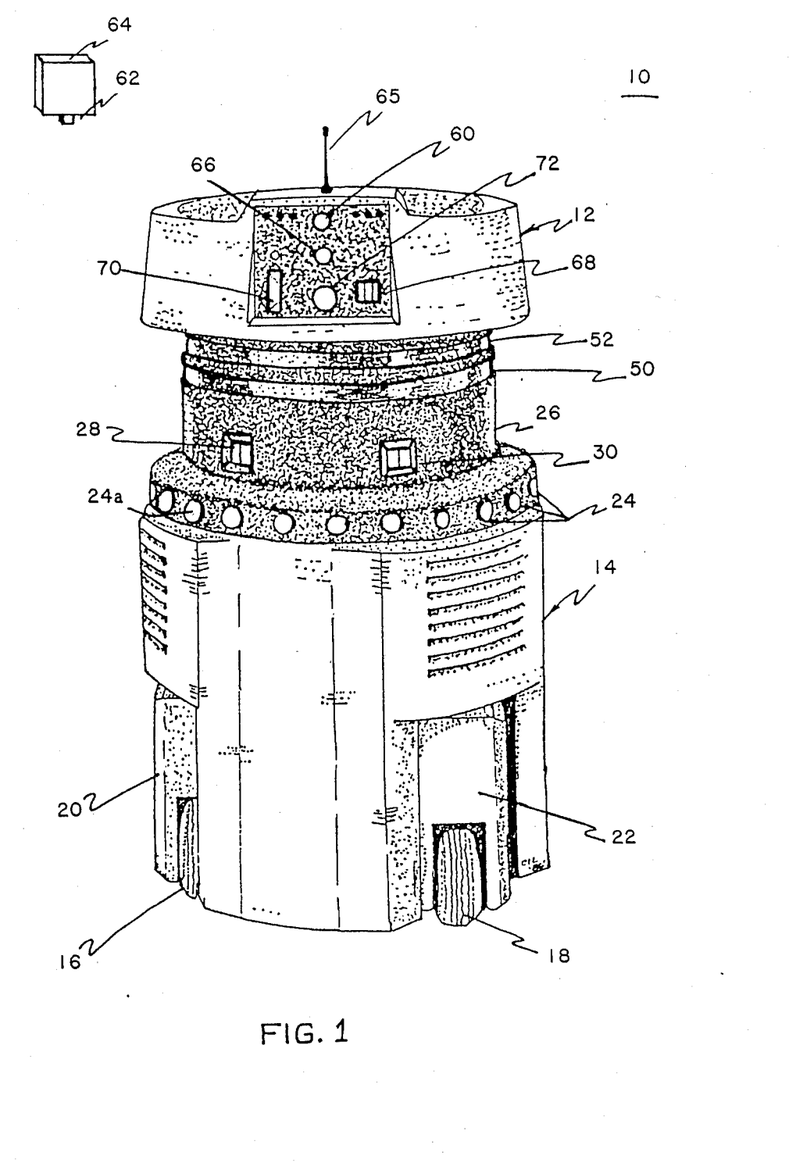
FIG. 1 is an axonometric view of a robot incorporating the position locating system according to this invention.

There is shown in FIG. 1 a vehicle, robot 10, according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers 24 such as the electrostatic transducer of the Sell type available from Polaroid equally spaced at fifteen degrees around the periphery of base 14. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 12 also includes an infrared sensor 68 for sensing radiation in the near infrared region, e.g. 904 nanometers, emitted from LED 62 of beacon 64, one or more of which are mounted on the walls in the space to be protected by robot 10 to assist in locating and directing robot 10 in the area in which it is to patrol. An ultrasonic transducer 66 similar to the transducer 24 used for maneuvering and avoidance may be provided for ranging. There is also provided a passive infrared sensor 68 similar to sensors 28-38. A microwave transmission and reception antenna 70 and a TV camera 72 which may be turned on when an apparent intrusion has occurred are also included in head 12.

Figure 2:
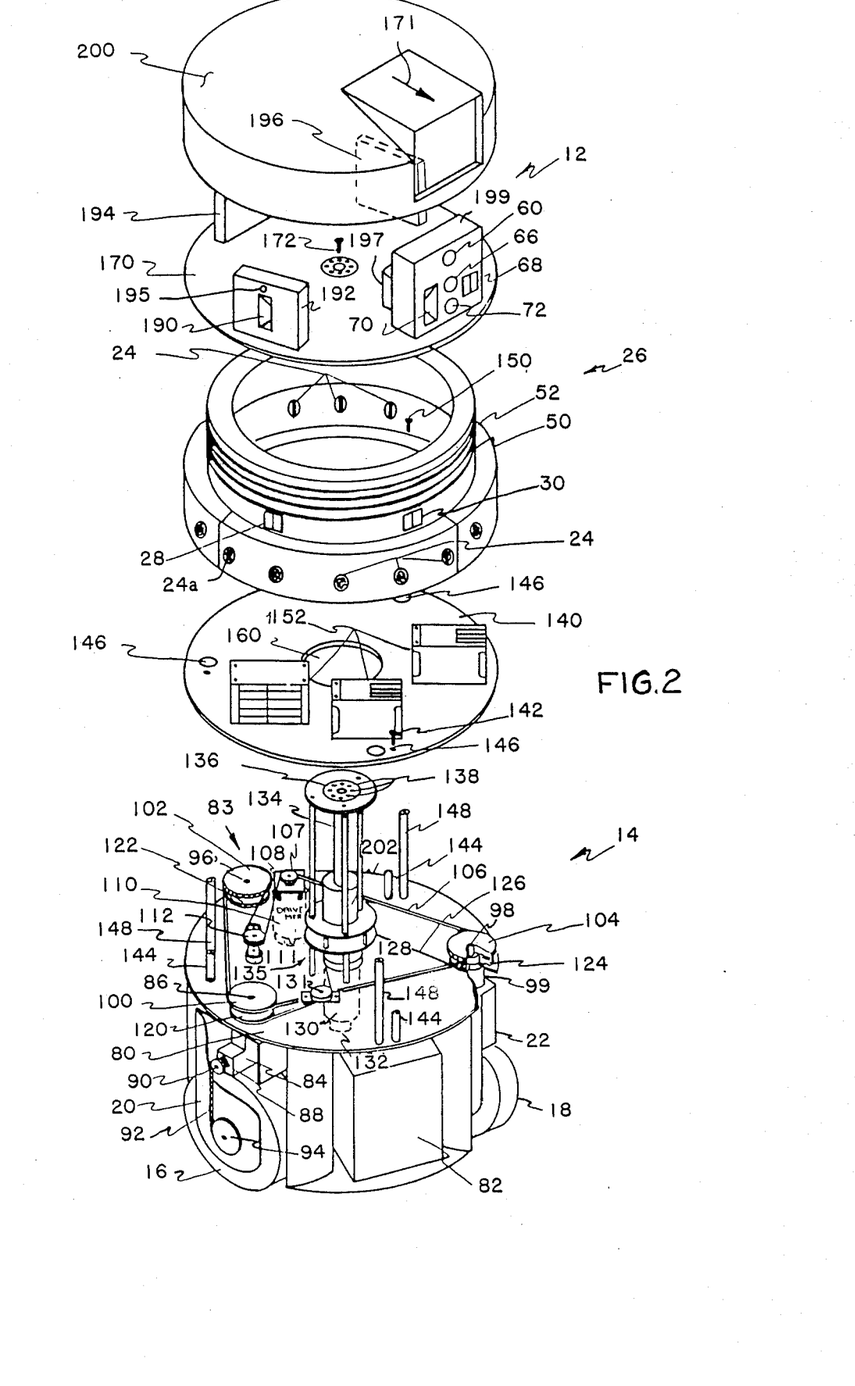
FIG. 2 is a simplified exploded view with parts removed of the robot of FIG. 1.

Base 14, FIG. 2, includes a main chassis 80 which carries three batteries 82 such as Globe 12V, 80AH, Gel Cells, only one of which is shown. When fully charged they will operate the robot for twelve hours or more. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88, which operates pulley 90, which in turn through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106. Three additional shafts, only one of which, 99, is shown, concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motor shaft is connected through pulley 128 to extension shaft 134, the top of which is provided with a flange 136 with a plurality of mounting holes 138. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated at items 152 that are contained in the base 14, including the beacon module described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. In addition to the primary microwave sensor 70 there are three additional microwave sensors 190, 330, 332, only one of which, 190, is visible spaced at ninety degrees about head plate 170 mounted in housings 192, 194, and 196. Housing 194 which faces directly to the back of the head as opposed to primary microwave sensor 70 which faces front, also contains a second passive infrared sensor 334, not visible, which is the same as passive infrared sensor 68. Cover 200 protects the electronics on head plate 170. All of the electrical interconnections between head 12 and base 14 are made through slip rings contained in slip ring unit 202 mounted about extension shaft 134 in base 14.

Figure 3:
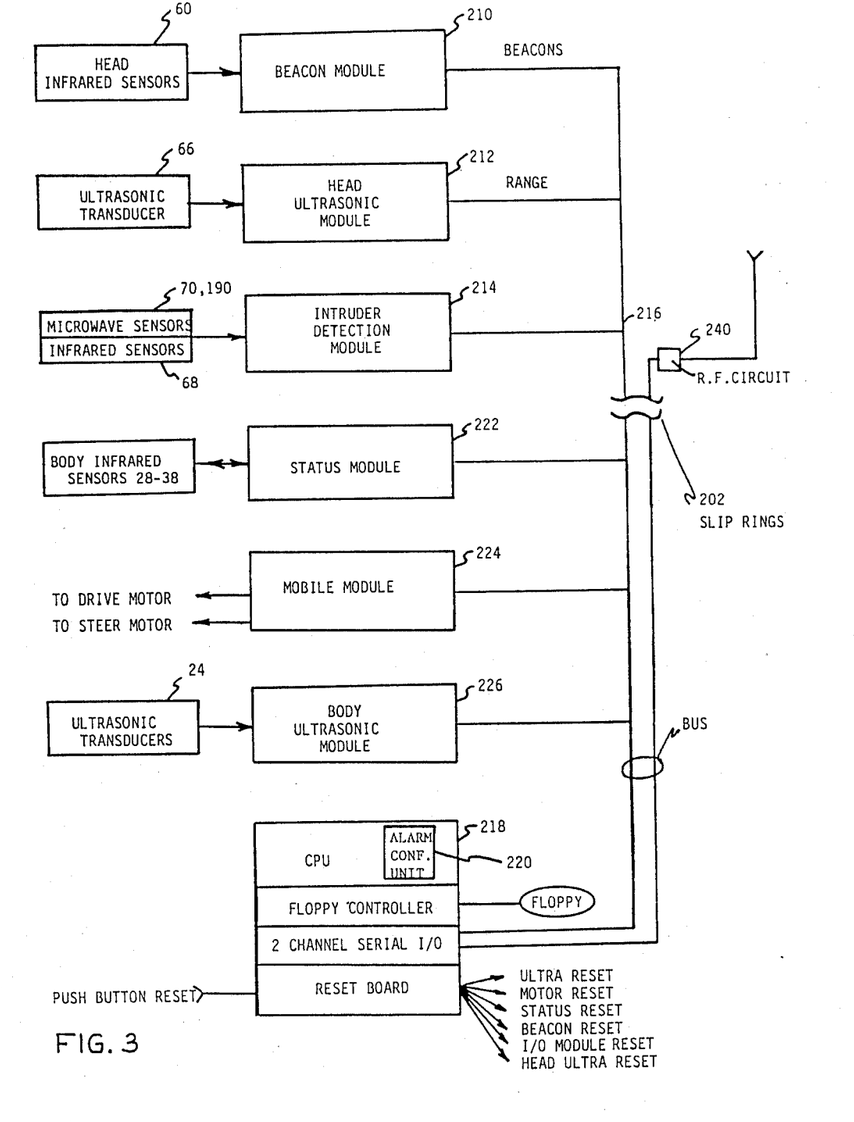
FIG. 3 is a block diagram of the electronic modules included in the robot of FIGS. 1 and 2.

Head 12, FIG. 3, includes three electronic portions: beacon module 210, head ultrasonic module 212, and intrusion detection module 214. Beacon module 210 responds to the head IR sensor 60 to determine what angle the beacon 64 is at with respect to the robot. That angle is fed on bus 216 through the slip ring unit 202 to the main CPU 218. Head ultrasonic module 212 responds to ultrasonic transducer 26 to provide ranging information on bus 216 to CPU 218. Intruder detection module 214 responds to the four microwave sensors 70, 190, 330, 332, and the two IR sensors 68, 334 to provide indications as of yet unconfirmed intrusion events. These events are processed by the alarm confirmation unit 220 in CPU 218 to determine whether a true confirmed intrusion has occurred. In the body section 14, there is included status module 222, mobile module 224, body ultrasonics module 226, and CPU 218. Status module 222 responds to the six infrared sensors 28-38 to provide an indication of an intrusion. Status module 222 may also monitor fire and smoke detectors, diagnostic sensors throughout the robot, as well as chemical and odor detectors and other similar sensors. Mobile module 224 operates and monitors the action of drive motor 110 and steering motor 130. The twenty-four ultrasonic transducers 24 provide an input to the body of ultrasonic module 226, which guides the movement and obstacle avoidance procedures for the robot. Finally, body 14 contains CPU 218, which in addition to the alarm confirmation unit 220 also interconnects with a floppy disk controller, two-channel serial I/O boards, and a reset board which receives inputs from a pushbutton reset and CPU 218 and outputs ultrasonic resets, motor resets, status resets, beacon resets, I/O module resets and head ultrasonic resets. CPU 218 also receives inputs from RF antenna 65 through RF circuit 240.

Figure 4A:
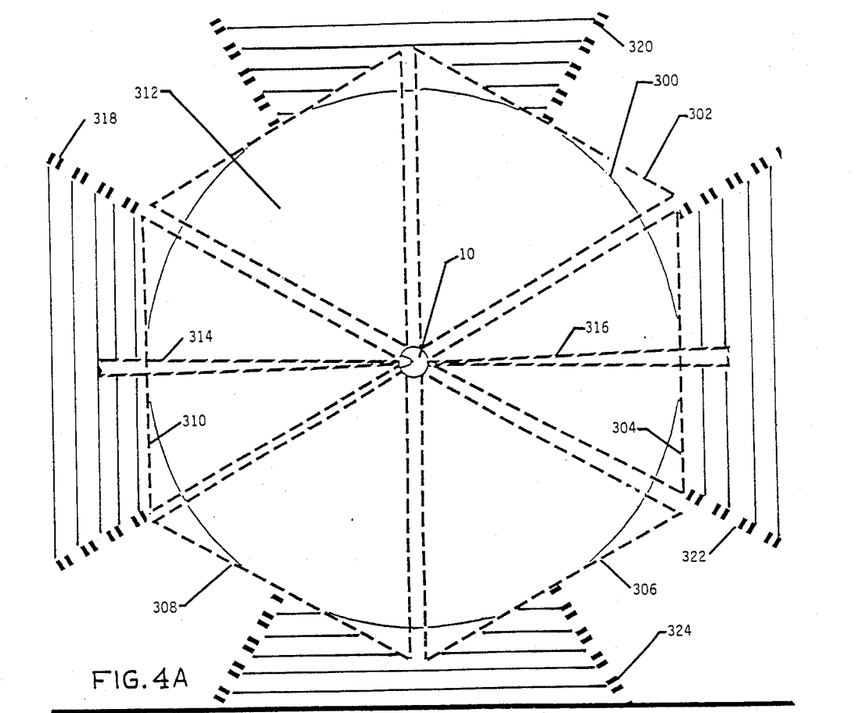
FIG. 4A is a plan view of the fields of view of the ultrasonic infrared and microwave sensors of the robot of FIG. 1.
Figure 4B:
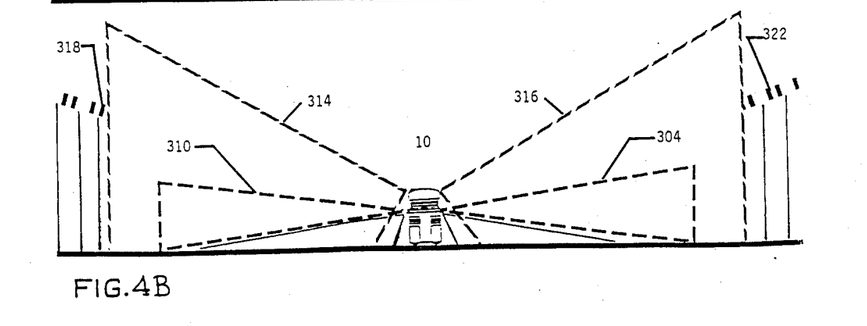
FIG. 4B is a side elevational view taken along line 4B—4B of FIG. 4A, showing the vertical profile of the fields of view.

A top plan view of the fields of view of the various sensors and transducers is shown in FIG. 4A. The twenty-four ultrasonic transducers 24 have a complete 360° field of view 300. The six infrared sensors 28, 30, 32, 34, 36, 38, on body 14 provide six triangular fields of view 302, 304, 306, 308, 310 and 312. The two infrared sensors 68 and 334 on head 12 provide the narrower fields of view 314 and 316, and the four microwave transducers 70, 190, 330, 332 provide the four fields of view 318, 320, 322 and 324. The vertical profile of these fields is depicted in FIG. 4B. The field of view of the microwave transducers extends approximately one hundred fifty feet. That of the infrareds in the head extend about thirty feet, those of the infrared in the body about five feet, and the ultrasonics in the body also extend about twenty-five feet.

Figure 5:
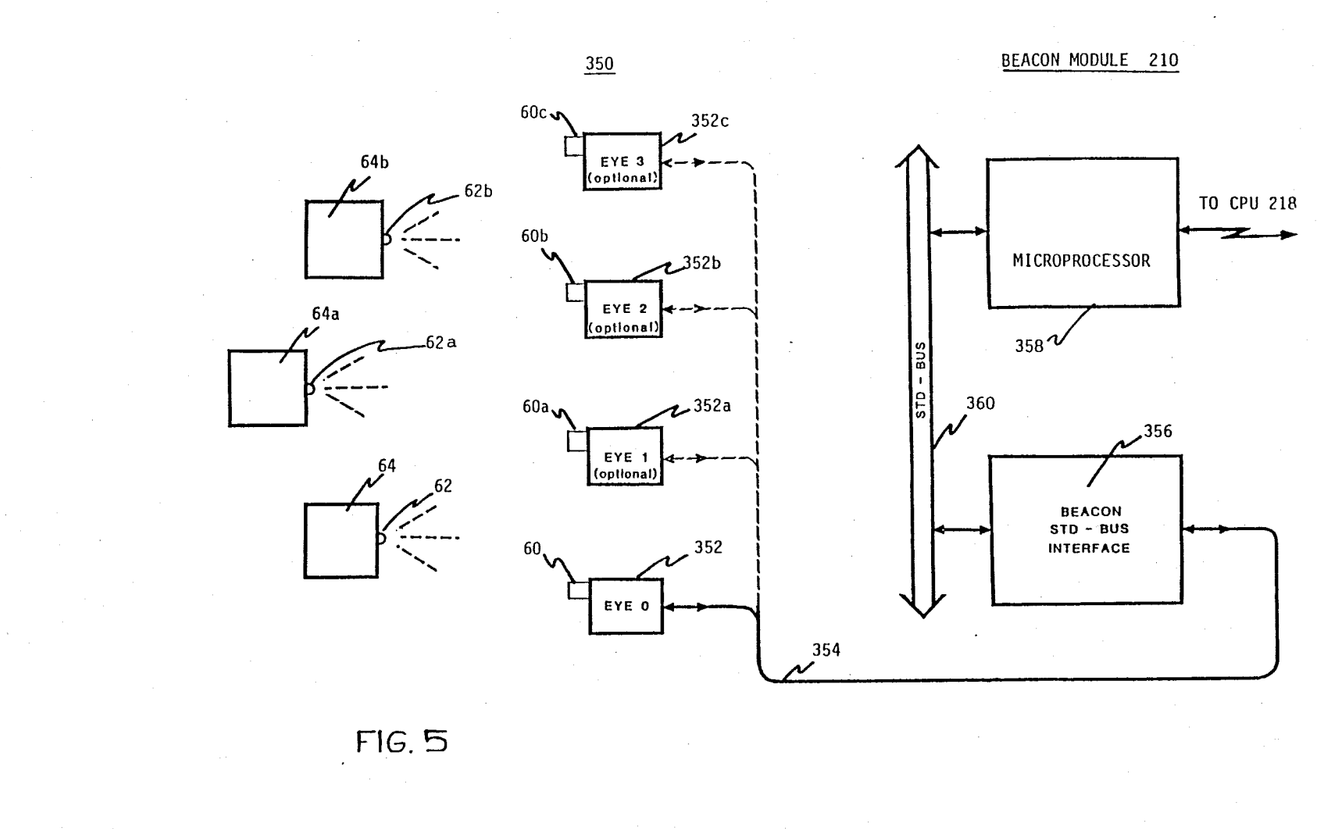
FIG. 5 is a block diagram of the position locating according to this invention including beacon sensors and the beacon electronic module.
Figure 6:
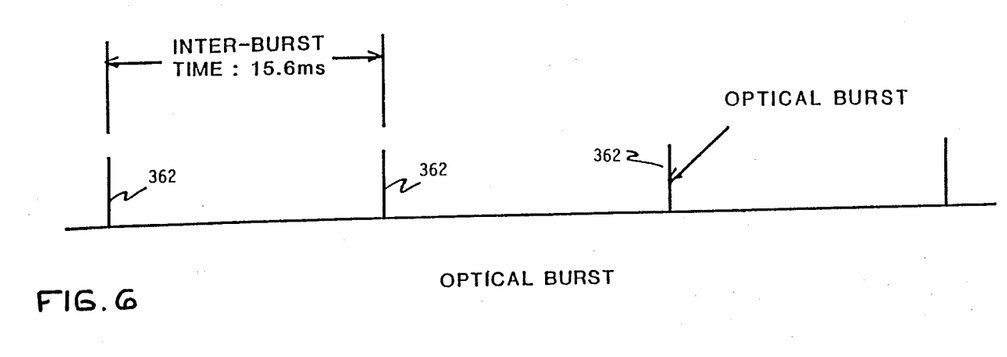
FIG. 6 is an illustration of the optical burst output of the beacons of FIG. 5.
Figure 7:
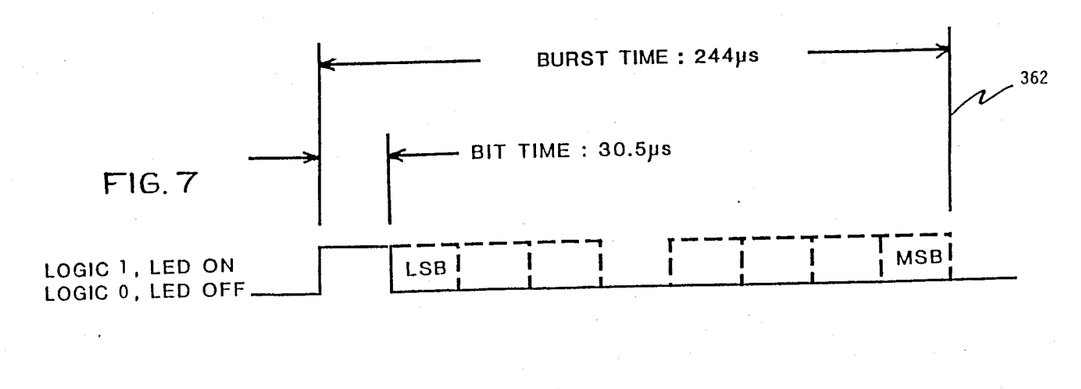
FIG. 7 is an enlarged detail of a single burst of FIG. 6.
Figure 8:
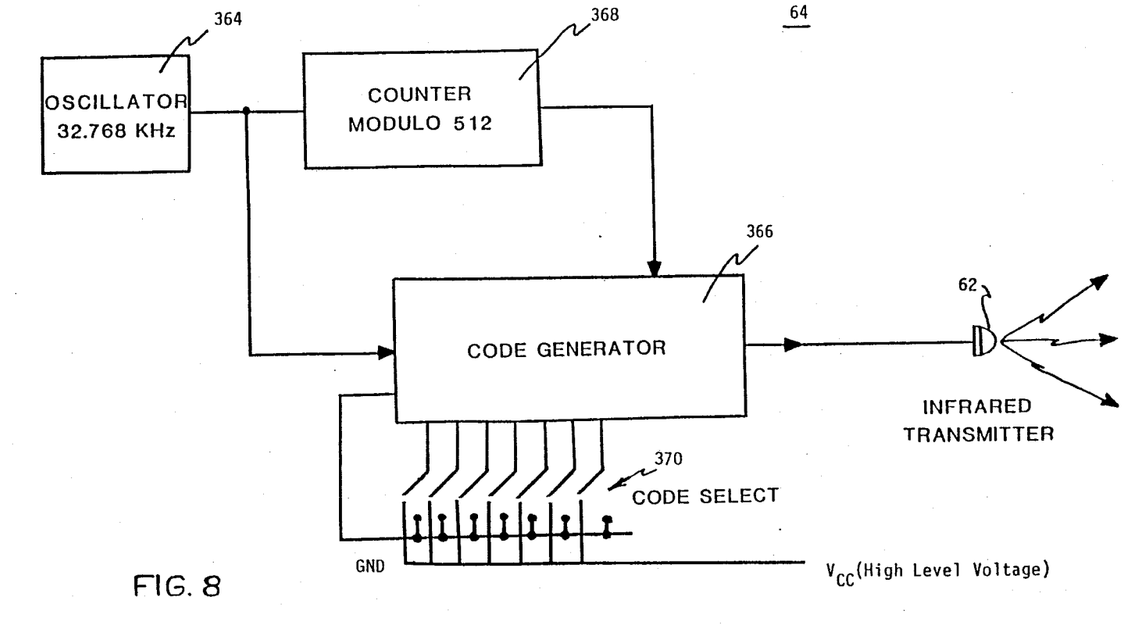
FIG. 8 is a more detailed block diagram of a beacon shown in FIG. 5.

The position locating system 350, FIG. 5, of this invention includes one or more beacon transmitters 64, 64a, 64b, each having an infrared source 62, 62a, 62b. Also included is an infrared sensor 60 sensitive to the infrared radiation emitted by source 62, and associated with sensor 60 is an eye circuit 352 whose output is provided on bus 354. Bus 354 interconnects with beacon STD-bus interface 356 in beacon module 210. Interface 356 communicates with microprocessor 358 over STD bus 360. Microprocessor 358 may be a Z80 microprocessor manufactured by Zilog. Microprocessor 358 communicates directly with CPU 218, which may be a Motorola 68,000 microprocessor. Beacon transmitter 64 provides an optical burst 362 of coded signals every 15.6 milliseconds. Each burst, as shown in greater detail in FIG. 7, has a total burst time of 244 microseconds which defines an eight-bit word, each bit being 30.5 microseconds. The first bit is a start bit; the next seven bits are code bits and represent 128 different possible codes. Each code can uniquely identify a single beacon, so that with this simple arrangement one hundred twenty-eight different beacons can be uniquely identified; that is, when the infrared source is seen that is considered a logic one. When the infrared source, which may be a light-emitting diode or LED, is off, then the signal is low and is considered a logic zero. The signals shown in FIGS. 6 and 7 are generated in beacon transmitter 64 by an oscillator 364, FIG. 8, which runs continuously at 32.768 KHz. Its output is delivered directly to a register in code generator 366. Its output is also delivered to a counter 368, modulo 512, which divides the 32.768 KHz signal to provide the time period shown in FIGS. 6 and 7. That is, with every 64th pulse (or every 15.6 ms) a burst occurs of eight bits. Eight bits are set to one or zero to produce the unique code for a particular beacon by the setting of the code select keys 370. When one of the keys 370 is toggled to ground, the associated stage of the register in 366 is grounded, thereby placing a logic one in that bit position. Switches that are toggled to high level voltage produce a logic zero in the associated stage. The patterns of ones and zeros modulate the infrared radiation produced by LED 62 so that a coded signal is provided which uniquely defines the particular beacon.

Figure 9:
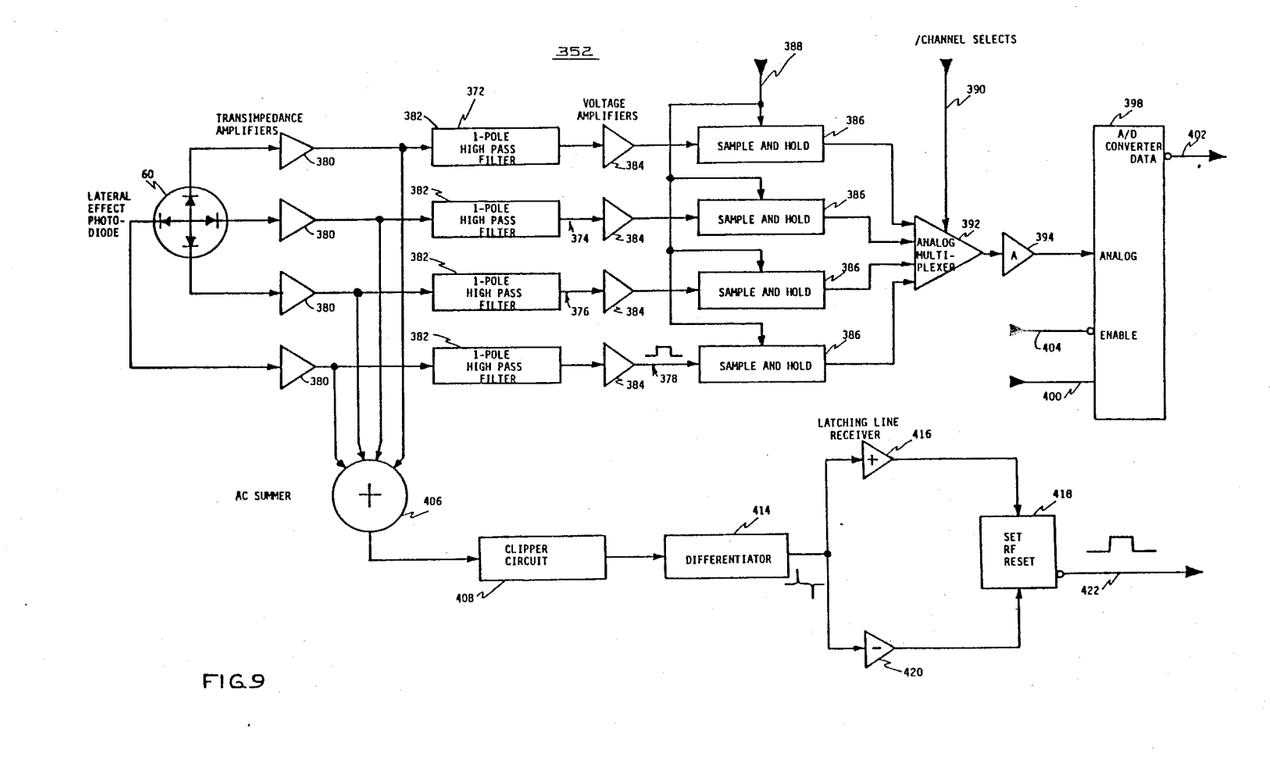
FIG. 9 is a more detailed block diagram of an eye shown in FIG. 5.

Sensor 60 in eye circuit 352, FIG. 9, is a multisector sensor such as a dual-axis lateral effect photodiode. It provides four separate outputs, each indicative of the infrared radiation incident on its particular sector. By analyzing the relative values of the radiation falling on the different sectors, a determination can be made as to the angle of the sensor to the emitting beacon. Each of the four sector outputs from photodiode 60 is fed to a different channel 372, 374, 376, 378. Each channel includes an amplifier 380, high-pass filters 382, voltage amplifiers 384, and sample and hold circuits 386. High-pass filters 382 pass the coded signal from beacon 64 but block 60-cycle and 120-cycle signals introduced by ambient light conditions; periodically on command from microprocessor 358 a signal on sample and hold line 388 causes sample and hold circuits 386 to sample and hold the signal in each channel. Those signals are then multiplexed by analog multiplexer 392 as directed by a command from microprocessor 358 on line 390. The signal from each channel is fed directly to the gain control of amplifier 394. Finally, the output from each channel is fed to A/D converter 398, where it stops unless a control signal on line 400 from microprocessor 358 requests the angle data signal on line 402. Microprocessor 358 also provides a select and enable signal on line 404 to A/D converter 398 to indicate the particular eye circuit 352, 352a, 352b or 352c which is currently being interrogated.

Simultaneously with this, one or more of the outputs from photodiode 60 after passing through amplifiers 380 are combined in an AC summer 406 in order to maximize the signal which will be used to detect the identifying code. From summer circuit 406 the signal is passed to clipper circuit 408, which limits the output independent of the input amplitude. At this point the signal is constituted by one or more coded pulses riding on an envelope of sixty or one hundred twenty cycle noise. Differentiator circuit 414 is therefore used to detect only the transitions of the pulses; thus, for every positive-going transition a positive spike appears at the output of differentiator 414 and for every negative-going transition a negative spike occurs at the output of differentiator 414. The positive-going spikes pass through amplifier 416 and set flip-flop 418 to define the beginning of a pulse. Negative-going spikes passing through amplifier 420 reset flip-flop 418 and define the end of the pulse. In this way the pulses and the received coded signal are reconstituted one at a time to construct the code data signal on line 422.

Figure 10:
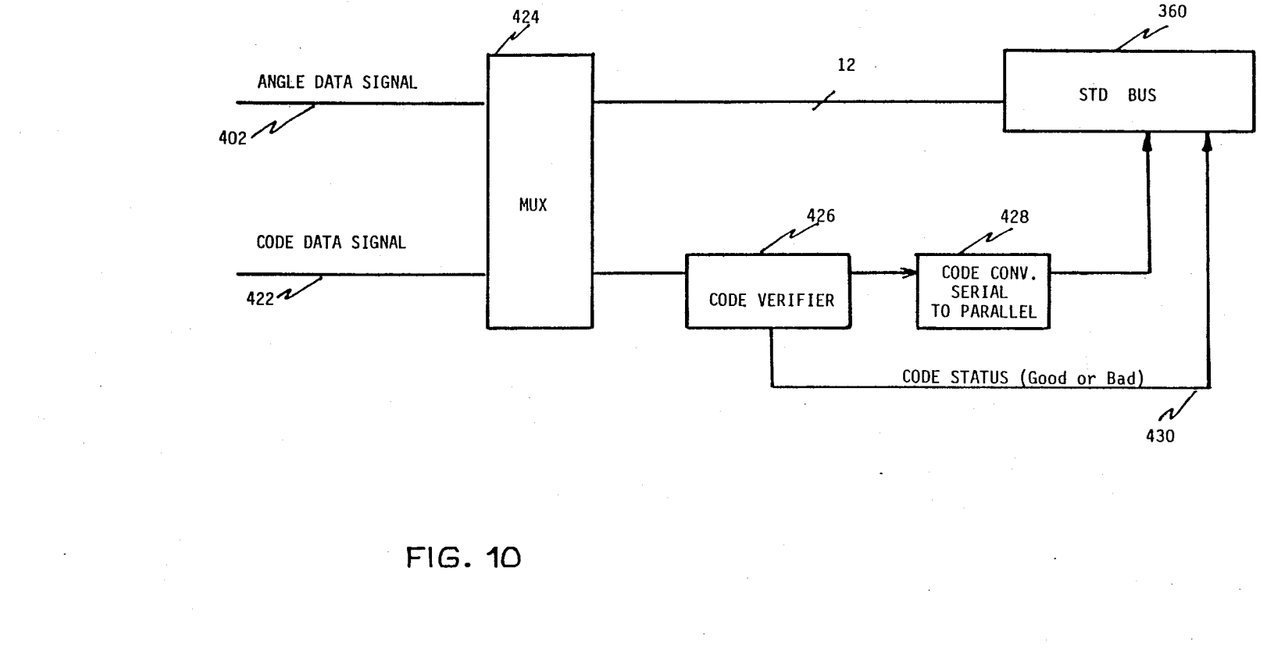
FIG. 10 is a more detailed block diagram of the beacon STD-bus interface of FIG. 5.

The angle data signal on line 402, FIG. 10, is fed directly through MUX 424 in beacon STD-bus interface 356 to STD-bus 360. The code data signal is fed from MUX 424 to code verifier circuit 426. After it is verified it is submitted to a converter 428 where it is changed from a serial signal to a parallel signal and then provided to STD-bus 360. Code verifier circuit 426 may utilize any of a number of techniques for verifying the authenticity of an incoming code. For example, the incoming signal may be sampled at fixed times following a start pulse when pulse transitions would normally be expected in a valid signal. If the transitions occur within narrow windows at the expected times, they are treated as valid code; otherwise they are rejected. The code status is provided on line 430 to STD-bus 360.

Figure 11A:
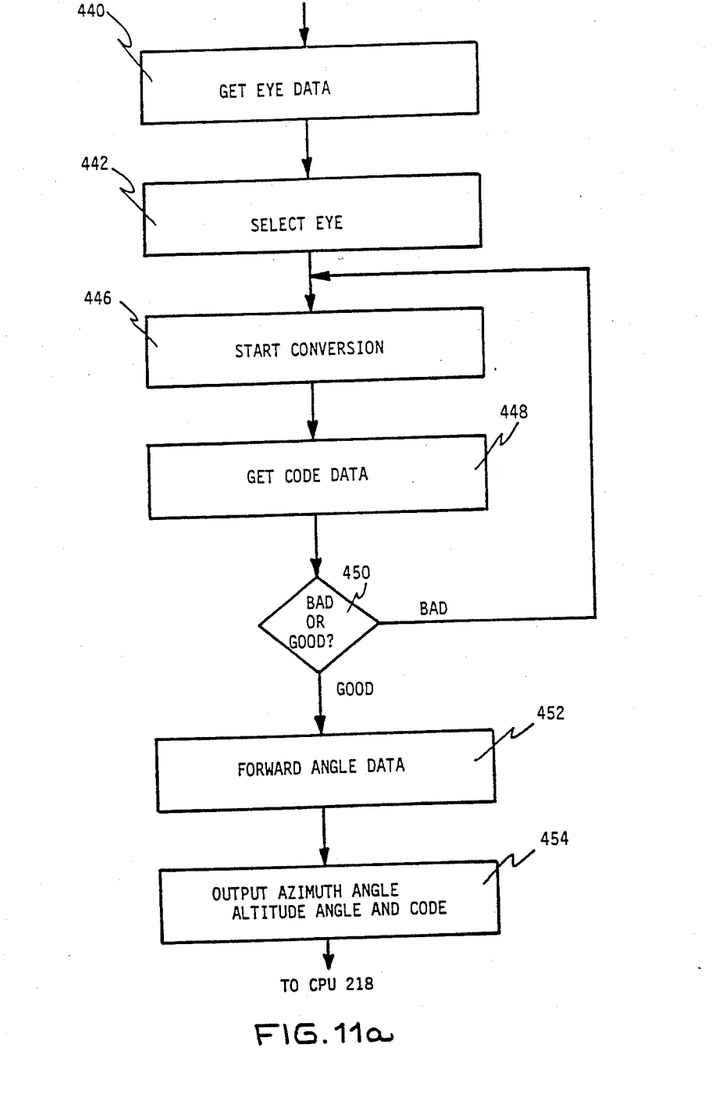
FIGS. 11a and b are a flow chart of the software utilized in the microprocessor of FIG. 5.
Figure 11B:
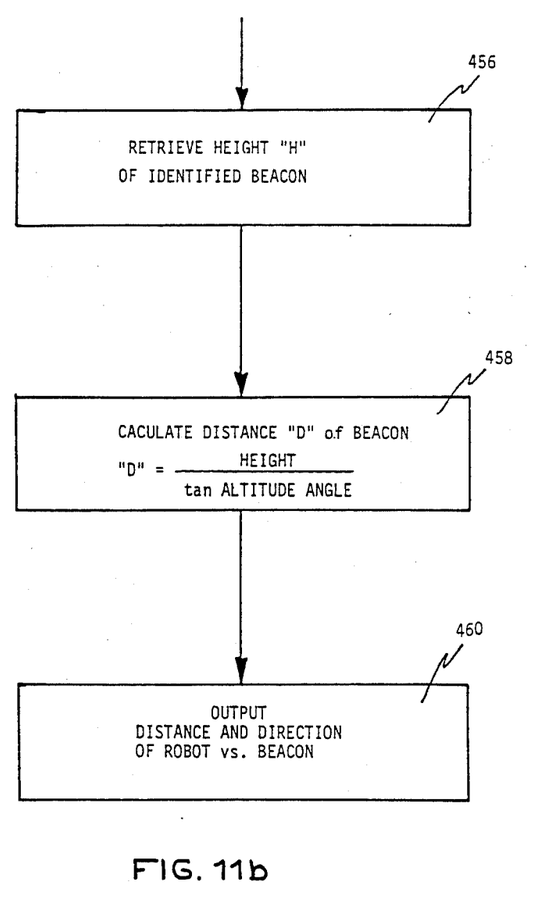

Under software control, FIG. 11, operation may begin with a signal from CPU 218 in step 440 with the command "Get Eye Data". When microprocessor 358 receives that signal it selects a particular eye in step 442. The A/D converter is then commanded to start the conversion in step 446 and the code data is obtained on line 422 in step 448. In step 450, if the code data is bad the cycle starts again with the beginning of a new conversion in step 446. If the code is good then the angle information is used and the next step 452 provides the azimuth angle and the altitude angle and the code in step 454 to microprocessor 358. Here the angle data is converted to the azimuth angle and the altitude angle and combined with the code and directed to CPU 218. The azimuth angle needs no further processing. The altitude angle and code are delivered to CPU 218, which then retrieves the height H of the identified beacon in step 456. That height is used to calculate the distance D to the beacon by triangulation, e.g., dividing the height by the tangent of the altitude angle in step 458. Then the distance and direction of the robot versus the beacon is output in step 460.

Figure 12:
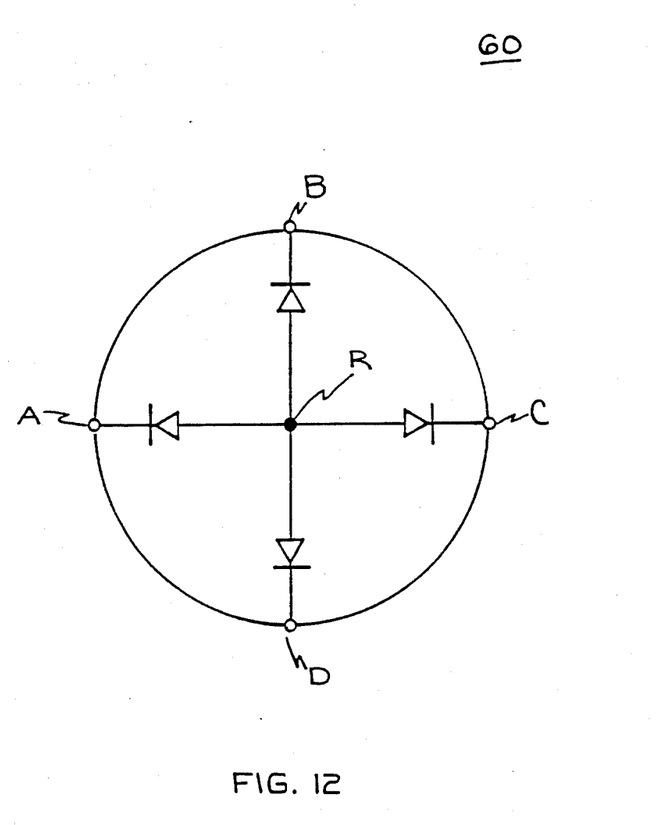
FIG. 12 is a schematic of the photodiode of FIG. 9.

The calculation in step 454, FIG. 11, of the azimuth angle and the altitude angle from the angle data signal is accomplished by determining the X position and the Y position from the dual axis lateral effect photodiode of FIG. 9 shown in more detail in FIG. 12. The X position is calculated according to the expression:

$$X \text{ position} = \frac{A - C}{A + C}$$

and the Y position by the expression:

$$Y \text{ position} = \frac{B - D}{B + D}$$

The division by A+C and B+D respectively normalizes the signal to reduce its dependence The angles are then determined by the expression:

$$\text{Altitude Angle} = \arctan\left(\frac{B - D}{B + D} \times k\right)$$

$$\text{Azimuthal Angle} = \arctan\left(\frac{A - C}{A + C} \times k\right)$$

where K is a constant dependent on the size of the detector and focal length of the light gathering lens if one is used:

$$K = \frac{\frac{1}{2}D}{F_1}$$

where D is the diameter of the detector and $F_1$ is the focal length of the lens.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A system for accurately locating a vehicle in its environment comprising:
    a plurality of remote beacons each located in a known height relative to said vehicle and producing a unique coded signal;
    sensor means on said vehicle for detecting a beacon signal;
    means, responsive to the code of the detected signal, for identifying the beacon emitting the detected signal;
    means, responsive to said sensor means, for substantially continuously resolving the azimuthal angle from said sensor means to the beacon to establish a radial path from the beacon on which the vehicle lies;
    means, responsive to said sensor means, for substantially continuously resolving the altitude angle from said sensor means to the beacon; and
    means, responsive to the resolved altitude angle and the known height of the identified beacon, for calculating the distance along the radial path from the sensor means to the beacon to accurately locate the vehicle in its environment.

2. The position locating system of claim 1 in which each said beacon is self-contained and independent of the other beacons.

3. The position locating system of claim 1 in which said coded signal is an optical signal.

4. The system of claim 3 in which said sensor means include means for filtering out the detected ambient light.

5. The position locating system of claim 1 in which said coded signal is an infrared signal.

6. The position locating system of claim 5 in which said infrared signal is approximately 904 nanometers.

7. The position locating system of claim 1 in which said sensor is a lateral effect photodiode.

8. The position locating system of claim 1 in which said coded signal is a modulated optical signal.

9. The system of claim 1 in which said means for identifying the beacon includes means for generating a code data signal representative of the coded beacon signal.

10. The position locating system of claim 9 in which said means for generating said code data signal includes a differentiator circuit for selecting signal transitions.

11. The position location system of claim 10 in which said means for generating said code data signal includes pulse generating means responsive to said differentiation circuit for reconstructing said coded signal from said code data signal.

12. The system of claim 1 in which said sensor means is a multisector sensor.

13. The system of claim 12 in which each sector of said sensor has an output signal.

14. The system of claim 13 in which said means for identifying the beacon includes summing means for combining the output signals of all said sectors of the said multisector sensors.

15. The system of claim 12 in which said means for resolving the azimuthal angle includes means for analyzing the relative amount of radiation from the beacon signal falling on at least two of the sensor sectors.

16. The system of claim 12 in which said means for resolving the altitude angle includes means for analyzing the relative amount of radiation from the beacon signal falling on at least two of the sensor sectors.

* * * * *